(12) United States Patent
Maxson et al.

(10) Patent No.: US 8,724,681 B2
(45) Date of Patent: May 13, 2014

(54) INGRESS NOISE LOCALIZATION IN A CABLE NETWORK

(75) Inventors: Ben Maxson, Beech Grove, IN (US); Walter Miller, Greenwood, IN (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 13/535,129

(22) Filed: Jun. 27, 2012

(65) Prior Publication Data

US 2012/0327988 A1 Dec. 27, 2012

Related U.S. Application Data

(60) Provisional application No. 61/501,611, filed on Jun. 27, 2011.

(51) Int. Cl.
*H04B 1/38* (2006.01)

(52) U.S. Cl.
USPC ........... 375/222; 379/326; 725/111; 725/112; 725/125

(58) Field of Classification Search
None
See application file for complete search history.

(56) References Cited

U.S. PATENT DOCUMENTS

| | | | |
|---|---|---|---|
| 4,520,508 A | 5/1985 | Reichert, Jr. | 725/125 |
| 5,737,461 A | 4/1998 | Sanders et al. | 385/27 |
| 5,742,713 A | 4/1998 | Sanders et al. | 385/24 |
| 5,881,362 A | 3/1999 | Eldering et al. | 725/125 |
| 6,049,693 A | 4/2000 | Baran et al. | 725/124 |
| 6,094,211 A | 7/2000 | Baran et al. | 725/125 |
| 6,166,760 A | 12/2000 | Kay | 725/107 |
| 6,215,514 B1 | 4/2001 | Harris | 725/74 |
| 6,292,944 B1 | 9/2001 | Harris | 725/107 |
| 6,321,384 B1 | 11/2001 | Eldering | 725/125 |
| 6,425,132 B1 | 7/2002 | Chappell | 725/107 |
| 6,772,437 B1 | 8/2004 | Cooper et al. | 725/111 |
| 6,775,840 B1 | 8/2004 | Naegel et al. | 725/111 |
| 6,868,552 B1 | 3/2005 | Masuda et al. | 725/125 |
| 6,880,170 B1 | 4/2005 | Kauffman et al. | 725/125 |
| 6,915,530 B1 | 7/2005 | Kauffman et al. | 725/125 |
| 6,978,476 B2 | 12/2005 | Zimmerman | 725/125 |
| 7,039,432 B2 | 5/2006 | Strater et al. | 455/501 |
| 7,152,025 B2 | 12/2006 | Lusky et al. | 703/18 |
| 7,254,827 B1 | 8/2007 | Terreault | 725/125 |
| 7,568,207 B1 * | 7/2009 | Braun | 725/9 |
| 7,584,496 B2 * | 9/2009 | Zinevitch | 725/107 |
| 7,742,777 B2 | 6/2010 | Strater et al. | 455/501 |
| 7,873,322 B2 | 1/2011 | Flask et al. | 455/67.11 |
| 2008/0319689 A1 | 12/2008 | Williams | 702/59 |

OTHER PUBLICATIONS

Arcom Digial i-Scout Probes Product sheet, 2010.
Electroline CLEARPath™ CPM-4 Mudule Product sheet, Electroline Equipment Inc. 2006.

* cited by examiner

*Primary Examiner* — Adolf DSouza
(74) *Attorney, Agent, or Firm* — Matthew A. Pequignot; Pequignot + Myers LLC

(57) ABSTRACT

Ingress noise labeling tags are coupled into the signal path at various nodes of a cable network. The tags imprint a unique electric signature into a local ingress noise, making the noise identifiable at the headend of the network. In one embodiment, tags do not require external control signals to operate, the electrical response of the tags being determined by present and/or past magnitudes of the return path signal. Such tags can be made entirely passive, not requiring a control signal or an external source of electrical power.

17 Claims, 10 Drawing Sheets

INGRESS NOISE LOCALIZATION IN A CABLE NETWORK

CROSS-REFERENCE TO RELATED APPLICATIONS

The present invention claims priority from U.S. Patent Application No. 61/501,611 filed Jun. 27, 2011, which is incorporated herein by reference for all purposes.

TECHNICAL FIELD

The present invention relates to performance monitoring of a cable network, and in particular to ingress noise localization in a cable network.

BACKGROUND OF THE INVENTION

Cable networks have, in recent years, moved beyond merely broadcasting television signals over a coaxial cable to subscribers in their homes. Subscribers of a cable network nowadays have a modem allowing transmission of digital signals upstream toward a headend of the network. Among many services afforded by cable modems are: an Internet service, a home shopping service using a television catalogue, and a voice-over-IP (VoIP) phone service.

In bidirectional cable networks, upstream and downstream signals occupy separate frequency bands called upstream and downstream frequency bands. In the United States, the upstream spectral band typically spans from 5 MHz to 42 MHz, while the downstream spectral band typically spans from 50 MHz to 860 MHz. Downstream information channel signals co-propagate in the downstream spectral band, and upstream signals co-propagate in the upstream spectral band. The frequency separation of the upstream and the downstream signals allows bidirectional amplification of these signals propagating in a common cable in opposite directions.

To provide upstream communication capability to a multitude of subscribers, the upstream frequency channels are used in a so-called time-division multiplexing (TDM) mode. Each cable modem is assigned a time slot, within which it is allowed to transmit information in form of short-duration radio-frequency (RF) bursts. The time slots to transmit the RF bursts by individual modems are assigned dynamically by a cable modem termination system (CMTS) disposed at the headend of the cable network.

The terminal devices, such as TV receivers and cable modems, are installed in customer premises, and thus are not easily accessible by cable network personnel. Electrical noise results from electromagnetic interference at the customer premises, "ringing" and ground loops due to improper equipment installation, faulty or damaged cabling, etc. The noise propagates back along the return paths of the signal towards the headend. Noise originating at a single location of a cable network can impede or even block upstream communications not only for a cable modem at that location, but also for other cable modems of the network. To make matters worse, noise from various locations of a cable network can accumulate as it propagates upstream towards the headend, increasing in magnitude due to a "funneling" effect of the upstream paths converging to a single point at the headend. This accumulated upstream path noise, commonly termed "ingress noise", represents a constant challenge for cable network operators. Not infrequently, isolating and eliminating a source of the ingress noise takes a major part of a network cable technician's workday.

To isolate a noise source, the technician measures noise levels at each input of a "bridger" amplifier, to determine which input exhibits the highest level of noise. The technician then proceeds to a next downstream amplifier connected to the noisiest input of the first amplifier, and repeats the measurement to isolate a noisiest input of the downstream amplifier. In going from amplifier to amplifier, the technician travels to various locations in the field, repeating the measurements until the source of the ingress noise is finally located. This iterative process, called "noise segmentation", can take up to 70% and more of the technician's work time. Not surprisingly, troubleshooting the ingress noise represents a major cost driver for delivery of two-way services by cable operators.

A supplementary troubleshooting method, which is sometimes used to the dismay of a technician's supervisor, is to disconnect power to all amplifiers downstream of the amplifier being tested, by removing a corresponding power jumper or fuse. If the noise is being introduced further downstream than the next active element, it will disappear when power is no longer supplied to that element; if the noise is being introduced somewhere between the amplifier under test and the next downstream amplifier, the noise will remain. By using this method, the technician can save one test per troubleshooting operation, obtaining approximately a 15 to 45-minute time savings per operation. However, each time the fuse is pulled, all services are disrupted to all homes in the portion of the network served by the downstream active elements. Due to the disruptive nature of the fuse-pulling method, network service technicians are discouraged from using it, despite the time savings achievable.

Various methods of less intrusive, automated ingress noise localization have been suggested. By way of example, Reichert in U.S. Pat. No. 4,520,508 discloses an ingress noise monitor disposed at a remote node. The noise monitor measures a noise level at the node and provides information about the measured noise level by amplitude-modulating the return path signal. Detrimentally, the Reichert devices are comparatively complex and costly. Installation of autonomous noise meters of Reichert across a node having dozens of legs can be prohibitively expensive.

Sanders et al. in U.S. Pat. Nos. 5,742,713 and 5,737,461 disclose a remotely or locally controllable upstream ingress filter disposed at a node. The filter is switched ON by pulling down a DC voltage applied to the cable. When the voltage is pulled, the filter short-circuits a low frequency band containing the upstream signal, for ingress diagnostic purposes. By pulling the voltage while observing a change of noise strength at the headend, the noise source can be localized. Detrimentally, the method of Sanders et al. requires independent and complex DC voltage control of all the cables extending from the fiber node to individual actives, which can be difficult to do when the cables running to different nodes are powered in series.

High cost of test equipment and maintenance associated with ingress noise segmentation have caused some providers to increase the robustness of cable network with respect to the ingress noise, so that the ingress noise segmentation would not be required. By way of example, Masuda et al. in U.S. Pat. No. 6,868,552 assigned to Fujitsu Limited of Kawasaki, Japan, discloses an ingress noise blocking device in form of a gate switch located at a node and switchable ON only during upstream RF bursts. This is done to suppress all signals, including the ingress noise, between the RF bursts. Since the ingress noise between the bursts is suppressed, it cannot impede reception of upstream RF bursts from other nodes, that occur at different moments of time. Thus, the "funneling effect" of the ingress noise in a cable network is reduced.

Similarly, Baran et al. in U.S. Pat. Nos. 6,049,693 and 6,094,211 disclose a remotely operable ingress noise blocking filter placed at a terminating junction of a cable network. The filter is configured to suppress upstream signals, allowing the upstream signals to pass only when a control signal is received from a downstream cable modem during short durations when the cable modem is allowed to transmit a signal.

Of course, the systems of Baran and Masuda do not address a case where the ingress noise impedes the reception of the RF bursts from the very leg where the blocking filter is installed, especially when the RF bursts on multiple legs occur at the same time but at different carrier frequencies.

The prior art is lacking a simple, inexpensive, yet widely deployable solution for ingress noise localization. It is a goal of the invention to provide such a solution.

SUMMARY OF THE INVENTION

According to the invention, noise labeling devices, or "tags", are coupled into the signal path at various nodes or points of a cable network. The tags imprint a unique electric "signature" into a local ingress noise, making the noise identifiable at the headend of the network. In one embodiment, tags do not require external control signals to operate, their electrical response being determined solely by present and/or past magnitudes of the return path signal the tags are coupled to. Advantageously, such tags can be made entirely passive, that is, not requiring a control signal or a source of electrical power. Also in a preferred embodiment, tags have a form factor of a standard pluggable cable network component, making the tags easy to install, replace, or upgrade.

In accordance with the invention, there is provided a tag device for locating ingress noise in a cable network including a headend and a plurality of nodes in communication with the headend, the tag device comprising:
a housing; and
a subassembly within the housing, for providing a response to a return path signal, wherein the response is dependent on a magnitude of the return path signal and is characterized by a response function having at least one pre-defined parameter unique to the subassembly,
whereby, when the tag device is coupled to a return path of a first node of the plurality of nodes, ingress noise in the return path of the first node is identifiable at the headend.

The response can include a nonlinear response, a burst-switchable attenuation or a burst-switchable delay line, a lossy secondary path, or a combination thereof.

In accordance with another aspect of the invention, there is further provided a tag device for locating ingress noise in a cable network including a headend and a plurality of nodes in communication with the headend, the tag device comprising:
a housing; and
a modulator within the housing, for periodically attenuating the return path signal at a pre-defined frequency of several times per second to several times per hour, whereby, when the tag device is coupled to a return path of a first node of the plurality of nodes, ingress noise in the return path of the first node is identifiable at the headend,
wherein the housing has a form factor of a cable network element selected from the group consisting of a return path equalizer, a fuse, and an attenuator.

The modulator tag device is preferably operated for a first time interval, followed by a second time interval the modulator is not operated, wherein the ratio of the second time interval to the first time interval is at least 10:1, to reduce energy consumption. When the energy consumption is low, an energy harvester may be used that relies on the energy of the signal itself to provide the electrical supply power to the tag. The first and the second time intervals can be repeated in a quasi-periodic fashion.

In accordance with another aspect of the invention, there is further provided an apparatus for locating ingress noise in a cable network including a headend and a plurality of nodes in communication with the headend, the apparatus comprising:
a relay for periodic short-circuiting or disconnecting a power line at a first node of the plurality of nodes, wherein the power line is for powering active devices downstream of the first node, and
an RF analyzer for collecting an upstream RF signal at the node during time intervals when the power line is short-circuited, wherein the RF analyzer is configured for automatically determining absence of power in the power line.

In accordance with another aspect of the invention, there is further provided a method for locating ingress noise in a cable network including a headend and a plurality of nodes in communication with the headend, the method comprising:
(a) tagging a return path signal at a first node of the plurality of nodes using a tag device disposed at the first node, for providing a response to the return path signal, wherein the response is dependent on a magnitude of the return path signal and is characterized by a response function having at least one pre-defined parameter unique to the tag device;
(b) detecting the ingress noise at the headend; and
(c) identifying a portion of the ingress noise detected in step (b) that is generated at the first node, by determining a property of the ingress noise corresponding to the at least one parameter of the response function of the tag device.

In accordance with another aspect of the invention, there is further provided a method for locating ingress noise in a cable network including a headend and a plurality of nodes in communication with the headend, the method comprising:
(i) using a tag device to tag a return path signal at a first node of the plurality of nodes by periodically attenuating the return path signal at a first frequency of several times per second to several times per hour, the first frequency corresponding to the tag device;
(ii) detecting the ingress noise at the headend; and
(iii) detecting a fraction of the ingress noise detected in step (ii) that is modulated at the first frequency,
wherein step (i) is performed repeatedly at a duty cycle of 10% or less.

In accordance with yet another aspect of the invention there is further provided a method for locating ingress noise in a cable network including a headend and a plurality of nodes in communication with the headend,
the method comprising periodic short-circuiting or disconnecting a power line at a first node of the plurality of nodes, the power line supplying power to active devices disposed downstream of the first node, and collecting an upstream RF signal at the node during time intervals when the power line is short-circuited.

BRIEF DESCRIPTION OF THE DRAWINGS

Exemplary embodiments will now be described in conjunction with the drawings, in which.

Figure 1A:
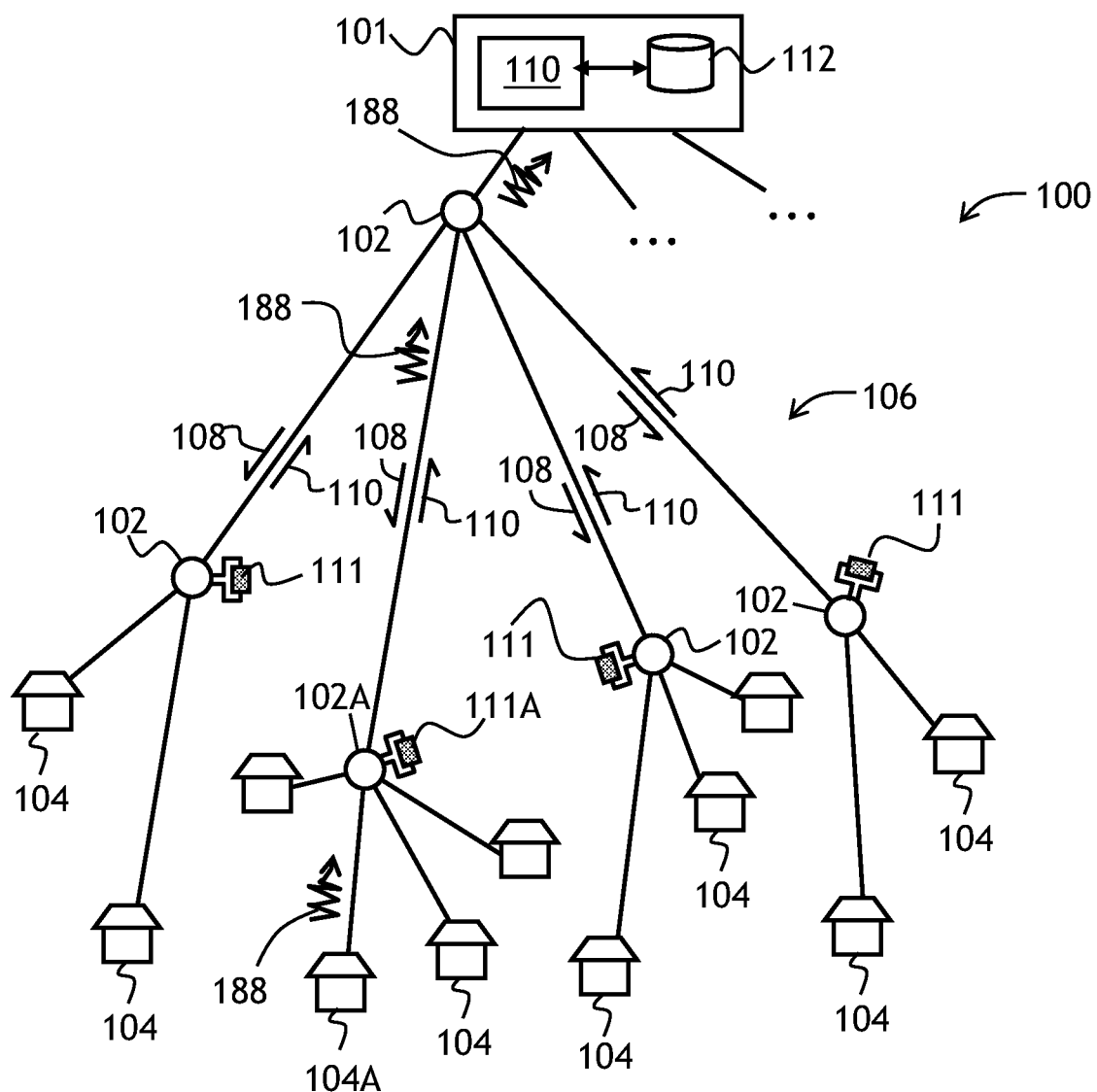
FIG. 1A is a block diagram of a cable network having tags of the invention deployed at nodes of the network.
Figure 1B:
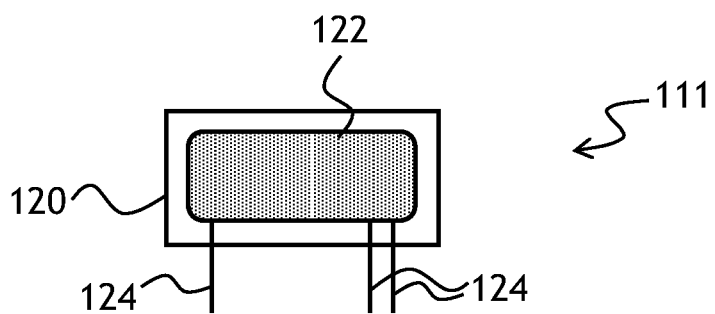
FIG. 1B is a schematic view of a tag device of the invention deployed in the cable network of FIG. 1A.
Figure 2A:
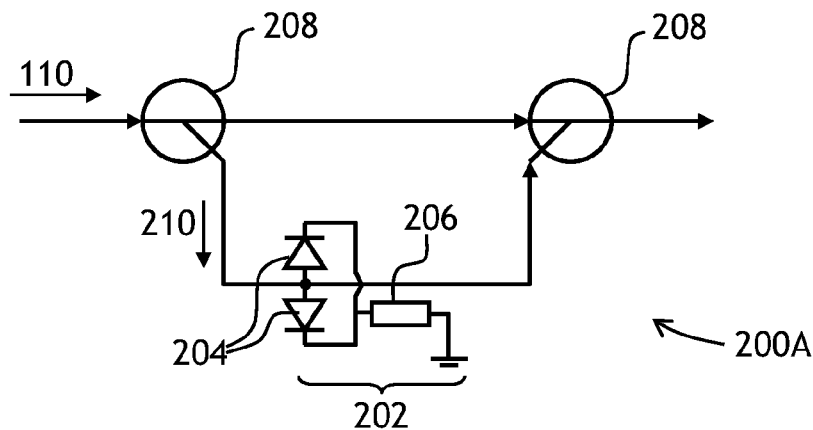
FIGS. 2A to 2F are block diagrams of various embodiments of the tag of FIG. 1B, including: a nonlinear tag (FIG.
Figure 2B:
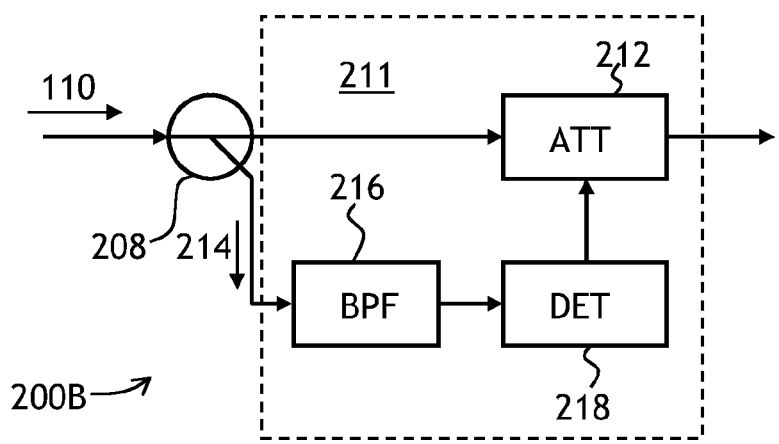
Figure 2C:
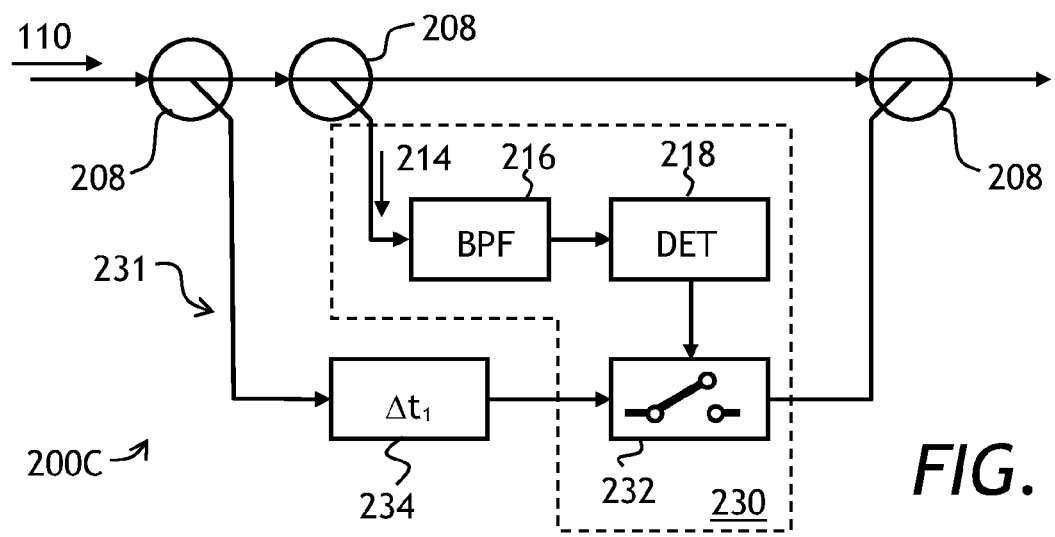
Figure 2D:
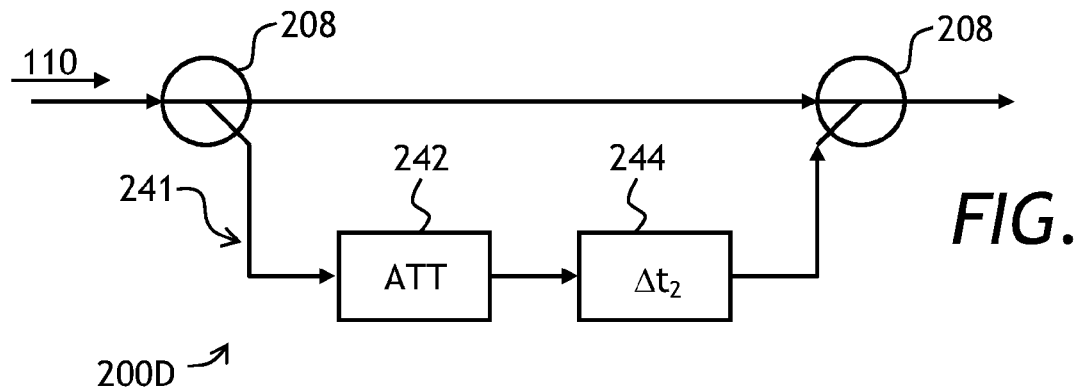
Figure 2E:
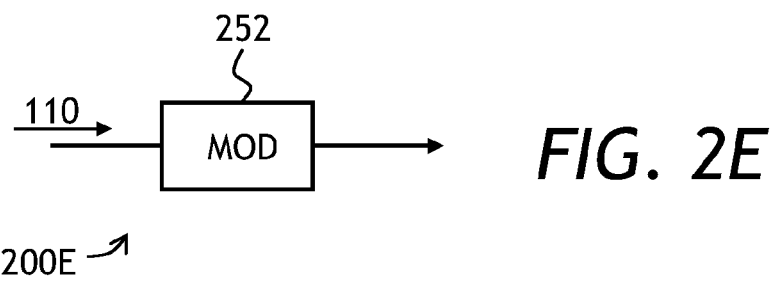
Figure 2F:
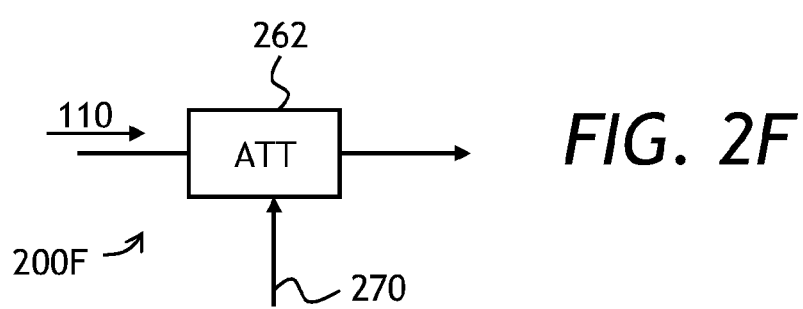
Figure 3A:
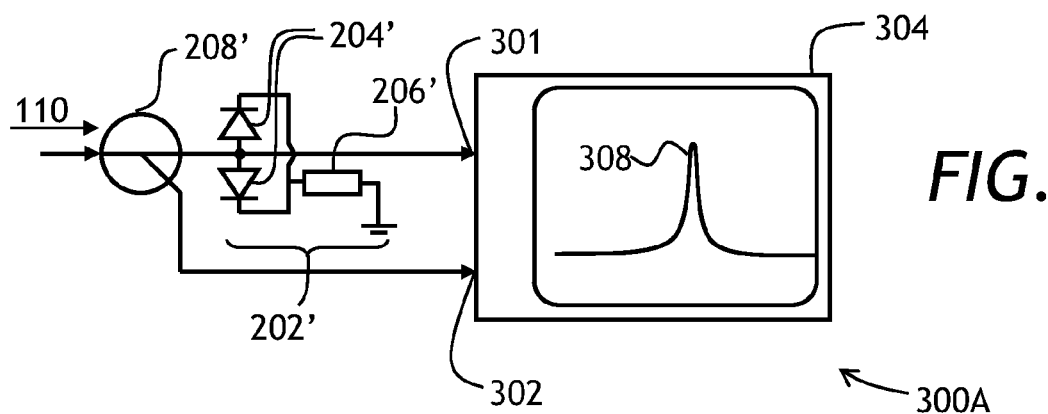
Figure 3B:
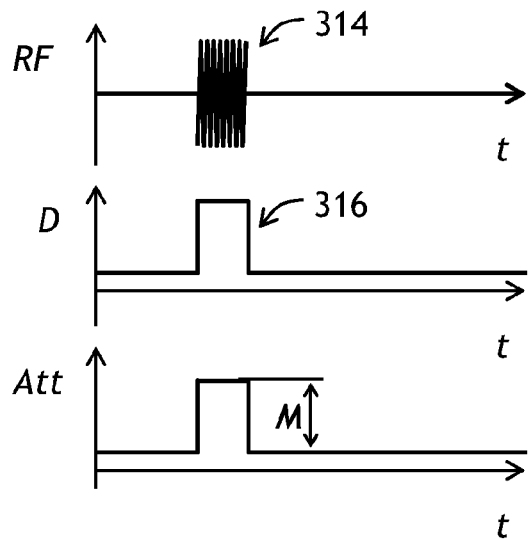
Figure 3C:
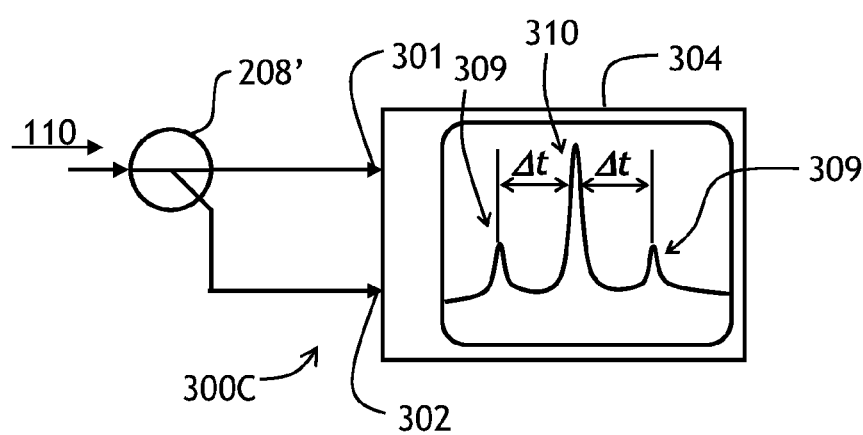
Figure 4A:
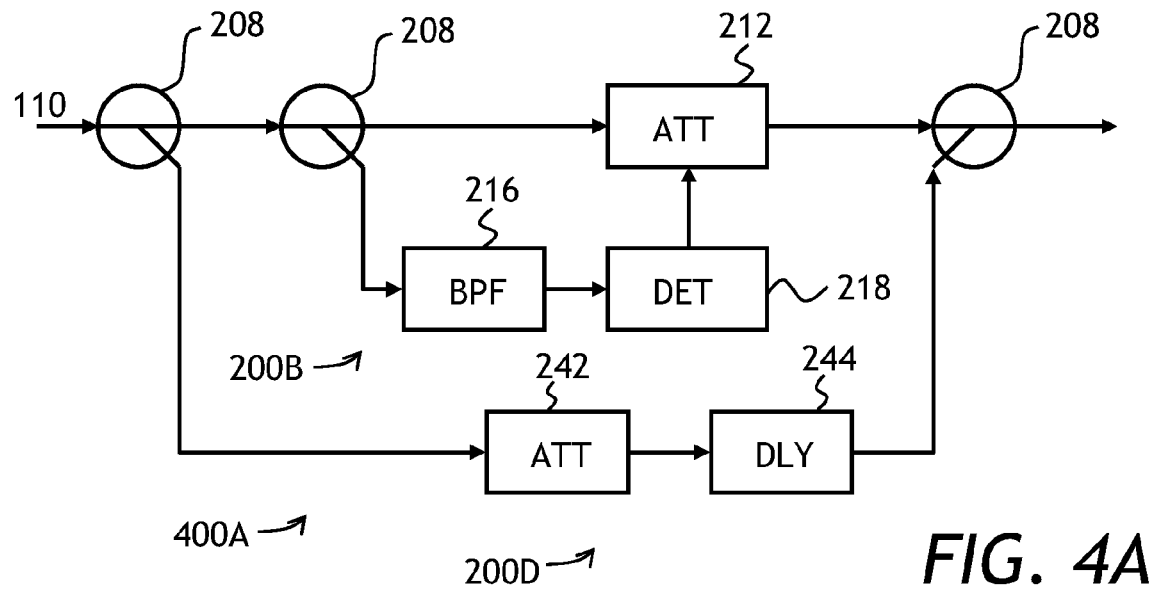
Figure 4B:
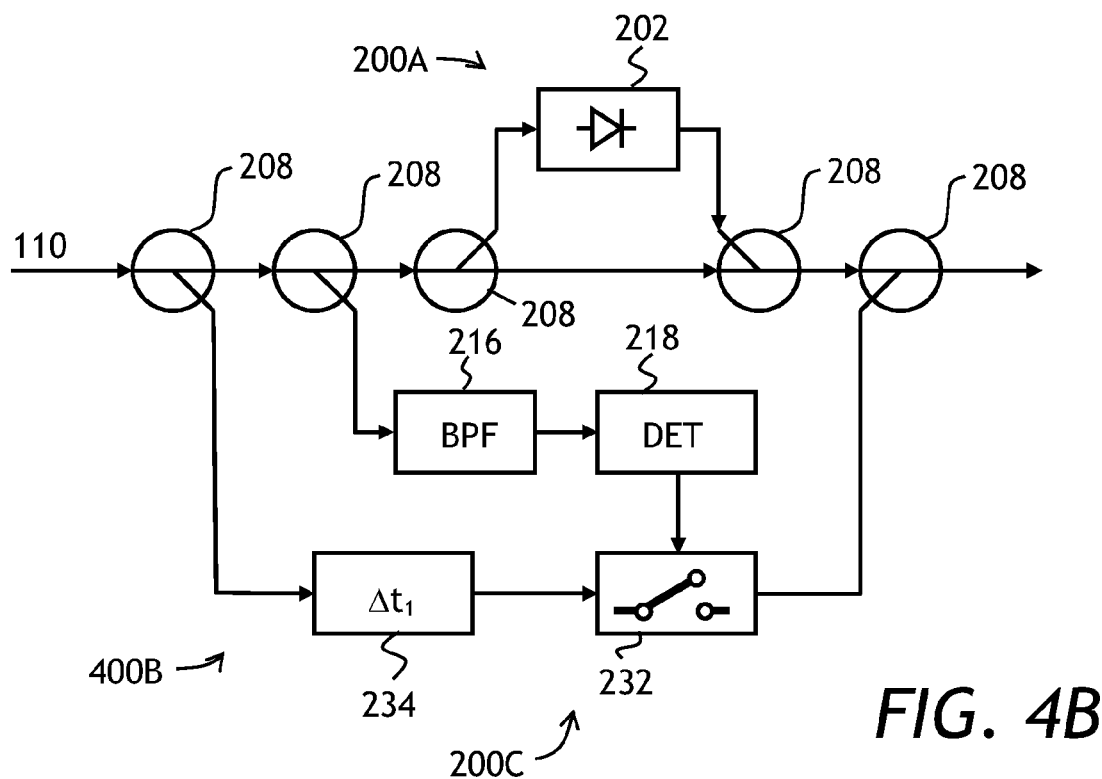
Figure 5:
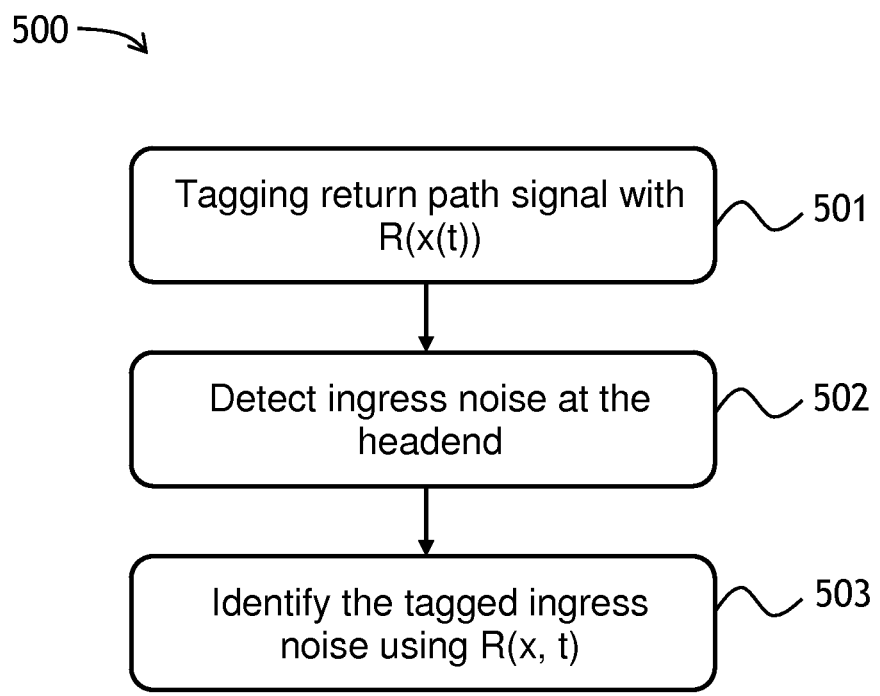
Figure 6A:
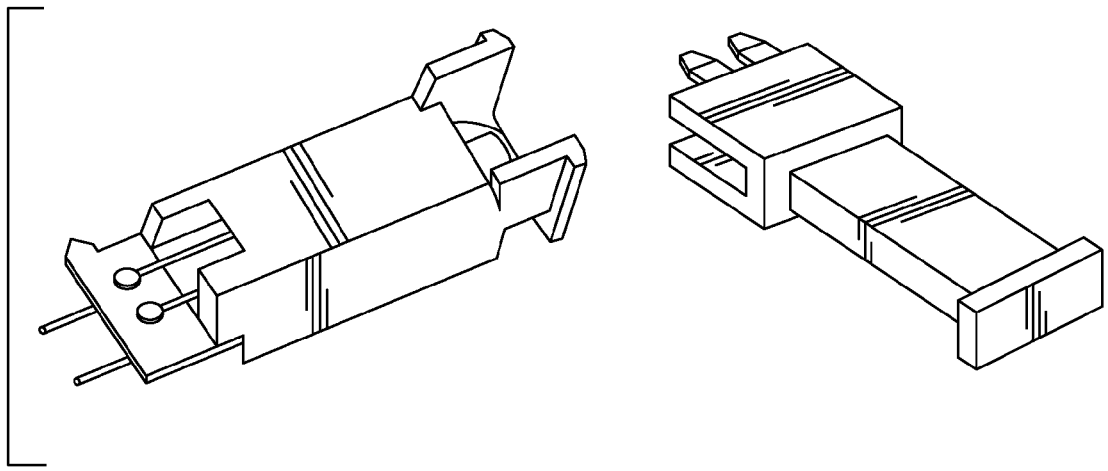
Figure 6B:
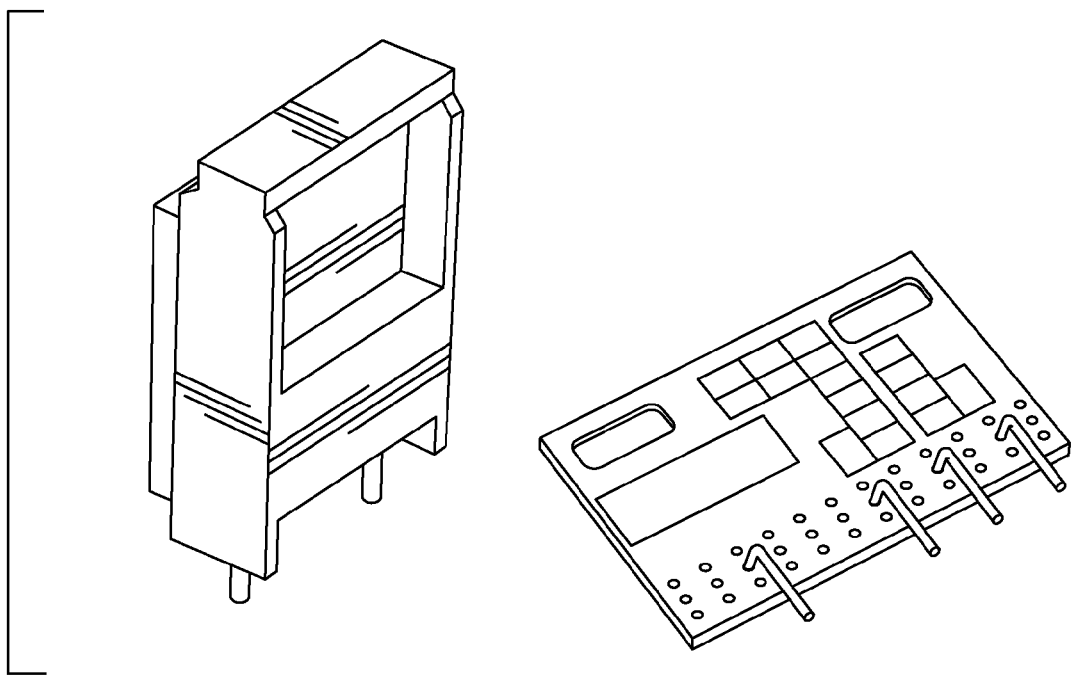
Figure 6C:
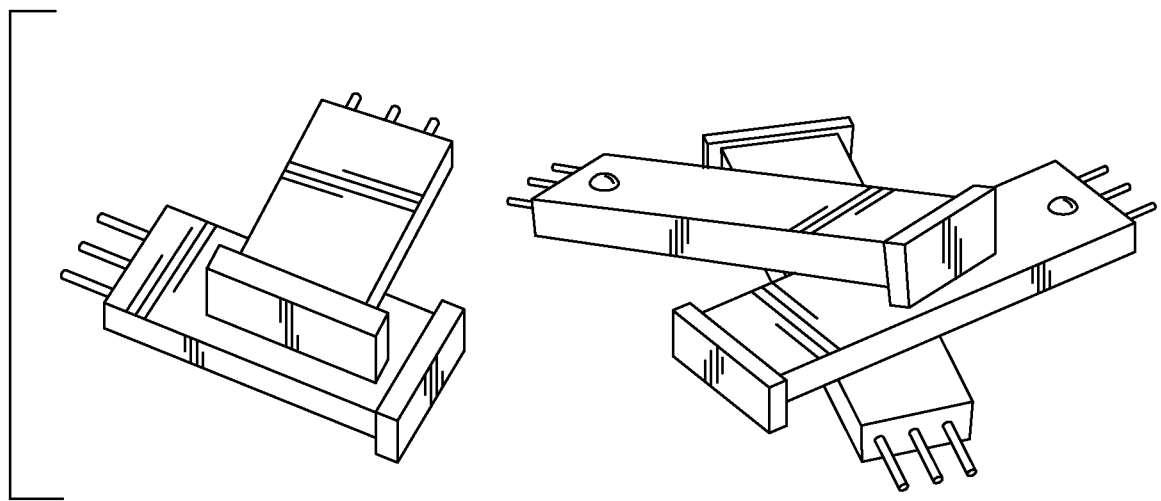
Figure 7:
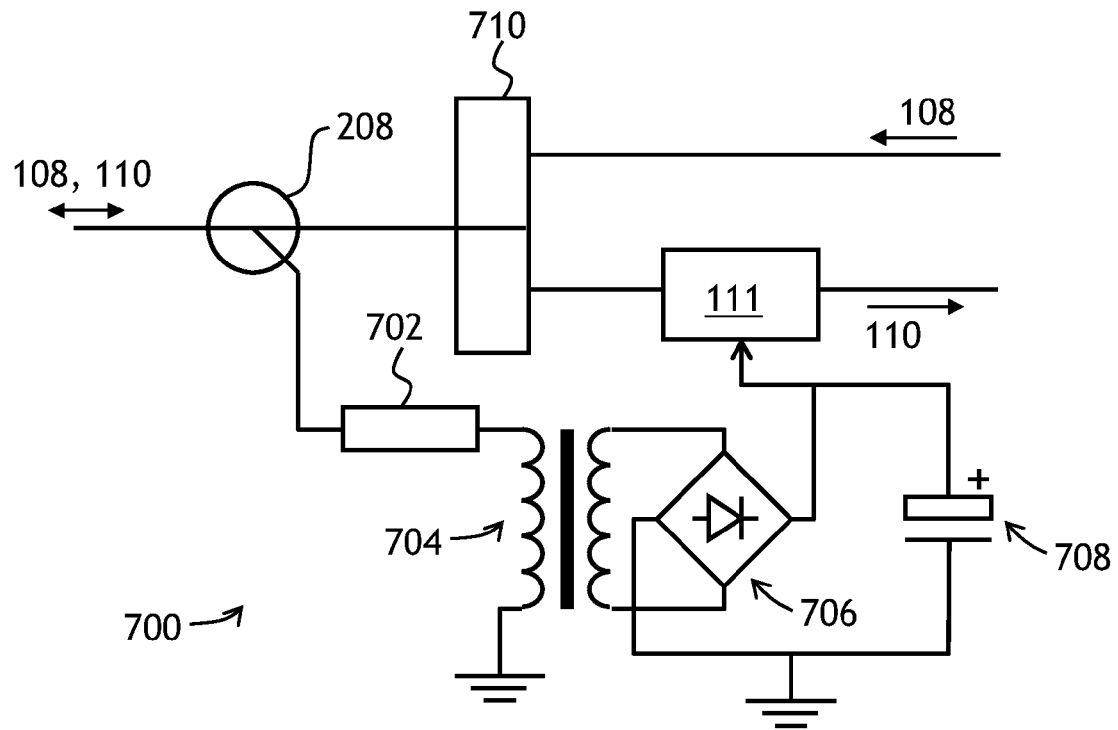
Figure 8:
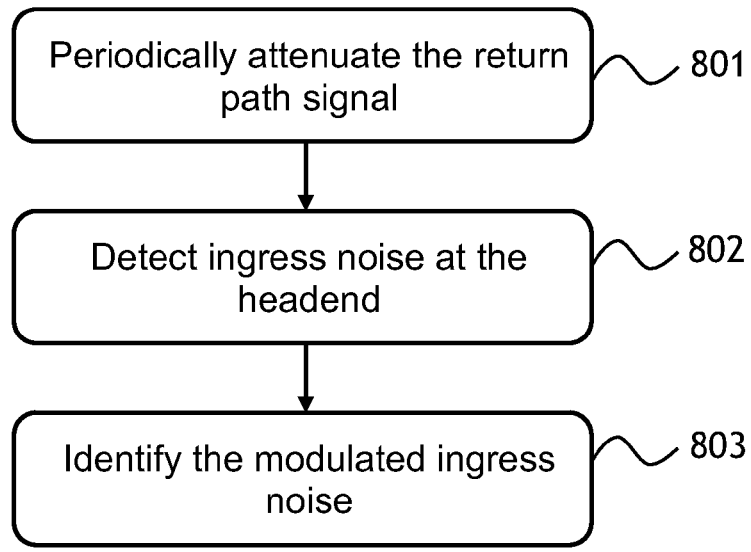
Figure 9:
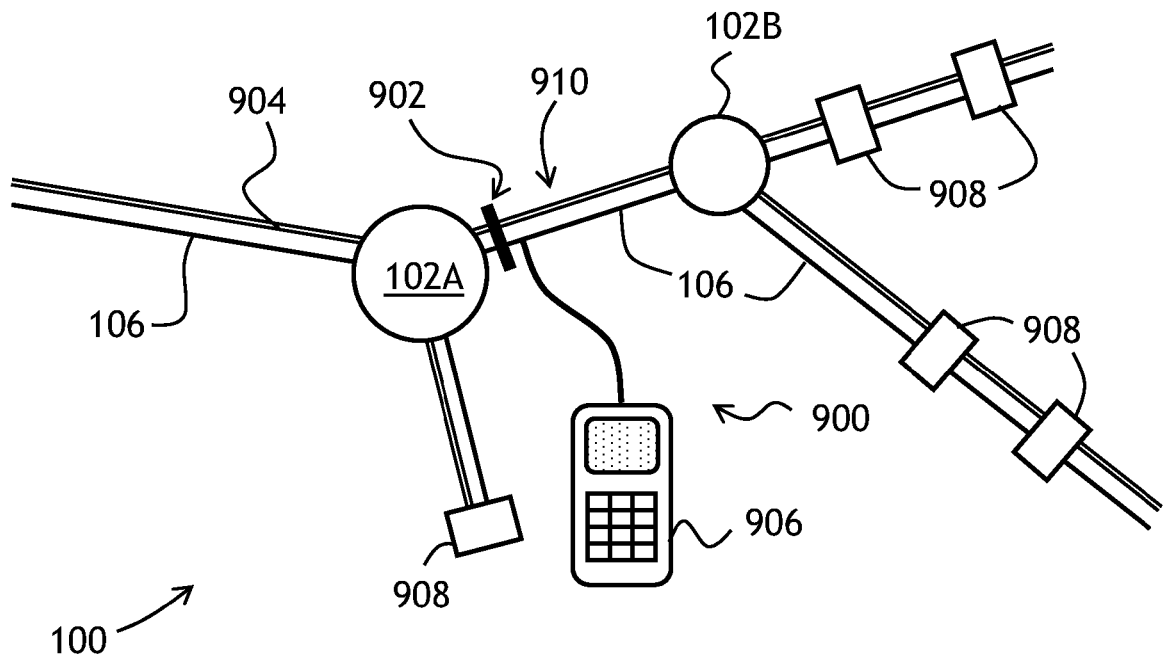
Figure 10:
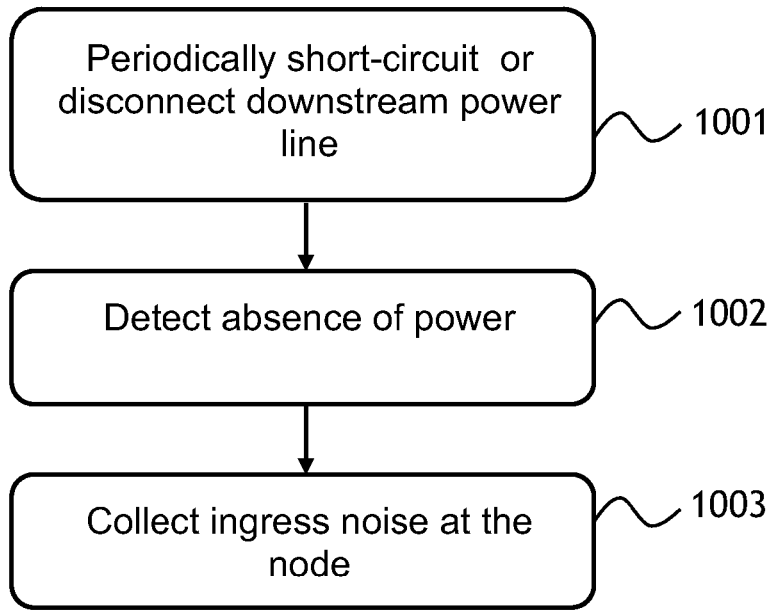

2A); a burst-triggered attenuator tag (FIG. 2B); a burst-triggered secondary path tag (FIG. 2C); a lossy secondary path tag (FIG. 2D); a modulator tag (FIG. 2E); and a controllable attenuator tag (FIG. 2F);

FIG. 3A is a block diagram of a headend ingress noise processor for detecting noise tagged with the nonlinear tag of FIG. 2A;

FIG. 3B is a set of time diagrams for a burst-triggered attenuator tag of FIG. 2B;

FIG. 3C is a block diagram of a headend ingress noise processor for detecting noise tagged with the secondary path tags of FIGS. 2C and 2D;

FIGS. 4A and 4B are block diagrams of "compound" tags of the invention, including: the burst-triggered attenuator tag of FIG. 2B combined with the lossy secondary path tag of FIG. 2D (FIG. 4A); and the nonlinear tag of FIG. 2A combined with the burst-triggered secondary path tag of FIG. 2C (FIG. 4B);

FIG. 5 is a flow chart of a tagging method according to the invention, using the tags of FIGS. 2A to 2D, 4A, and 4B;

FIGS. 6A to 6C are three-dimensional views of various standard form factors for the tags of FIGS. 2A to 2F, 4A, and 4B, including: a fuse form factor (FIG. 6A); a filter form factor (FIG. 6B); and an attenuator form factor (FIG. 6C);

FIG. 7 is an electrical circuit of a power harvester coupled to the tag of FIG. 1B;

FIG. 8 Is a flow chart of a tagging method according to the invention, using the tag of FIG. 2E;

FIG. 9 is a schematic diagram of a cable network being tested using a short-circuiting ingress noise segmentation method; and FIG. 10 is a flow chart of the short-circuiting ingress noise segmentation method according to the invention.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Referring to FIGS. 1A and 1B, tag devices 111, 111A for locating ingress noise are shown deployed in a cable network 100 including a headend 101 and a plurality of nodes 102, 102A in communication with the headend 101 through a network of electrical coaxial cables termed "a cable plant" 106. The cable plant 106 carries downstream signals 108 and upstream signals 110 between the headend 101, the nodes 102, 102A, and a plurality of customer premises 104, 104A. Herein, the term "nodes" refers to points of the network where the downstream signals 108 are branched out, for example a branching optical amplifier is considered a "node".

The downstream signals include TV channels, Internet downloads, voice-over-IP (VoIP) phone conversations, etc. Modems at the customer premises 104, 104A send upstream signals 110 in return signal paths towards the headend 101. The upstream signals include VoIP conversations, Internet uploads, etc. Ingress noise 188 enters the cable plant 106 near a first 104A of the customer premises 104 coupled to a first 102A of the nodes 102, 102A. Herein, the term "first" does not denote order of items, but is merely an identifier. The ingress noise 188 propagates towards the first node 102A and then towards the headend 101. The ingress noise 188 impedes reception of the upstream path signals 110 from the remaining customer premises 104. It is to be understood that, in the context of the invention, the customer premises 104, 104A can be also considered as (terminal) nodes.

To assist a cable network operator in identifying the first node 102A where the ingress noise 188 entered the cable plant 106, the tags 111, 111A are coupled to the cable plant 106 carrying the upstream signals 110. The tags 111, 111A add a unique electrical response to the ingress noise 188, making the ingress noise 188 identifiable at the headend 101 of the network 100, so that the first node 102A can be identified as the "noisy" node 102A.

Referring specifically to FIG. 1B, the tag device 111 includes a housing 120 and an electrical subassembly 122 having terminals 124 and disposed within the housing 120. The subassembly 122 is preferably a passive subassembly not requiring an external power source to operate. Further, preferably, the response of the subassembly 122 is not externally controlled but depends solely on present and/or past magnitudes x(t) of the return path signal 110. This response is represented by a response function R(x(t)) having at least one pre-defined parameter P that is unique to each of the tags 111, 111A. In one embodiment, a response of the tags 111, 111A is represented by a response function R(t) that does not depend on the local signal magnitude x(t) but does depend on time t. The response signal y(t) of the tags 111, 111A is generally represented as $$y(t)=R(x(t),t) \cdot x(t) \quad (1)$$

Each of the tags 111, 111A modifies the ingress noise 188, with the purpose of making the ingress noise 188 identifiable at the headend 101. For this purpose, the headend 101 includes a processor and a database 112. In operation, the processor 110 processes the upstream signals 110 including the ingress noise 188, and the database 112 allows retrieval of the individual parameters P of the tags 111, 111A along with the information about the location of the tags 111, 111A installed throughout the cable network 100. The processor 110 processes the ingress noise 188 to identify the particular parameter P and inquires the database 112 to determine the tag 111A having the particular parameter P, and, subsequently, the first node 102A at which the tag 111A is installed.

Turning to FIGS. 2A to 2D and 3A to 3C, various examples of the subassembly 122 having a response function R(x(t)) dependent on the electrical signal in the upstream path (FIGS. 2A to 2D), and associated devices or methods for tagged noise detection (FIGS. 3A to 3C), are presented. Referring specifically to FIG. 2A, a nonlinear tag 200A includes a nonlinear element 202 for generating a non-linear product of the return path signal 110. The nonlinear element 202 includes a pair of diodes 204 connected to a load resistor 206. The diodes 204 have a nonlinear voltage-current characteristic, as is known in the art. Splitters/combiners 208 split a fraction 210 of the upstream signal 110 and mix the non-linear product generated by the pair of the diodes 204 back into the upstream signal path. In this case, the parameter P of the response function R(x(t)) includes a magnitude a of the nonlinear product:

$$R(x(t)) \propto a \cdot x(t) \quad (2)$$

The magnitude a is defined by the nonlinearity of the diodes 204, as well as by the split ratio of the splitters/combiners 208. When the nonlinearity of the diodes 204 is small enough, it is feasible to connect the diodes 204 directly to the upstream path, without the splitters/combiners 208. Conveniently, the nonlinear tag 200A does not require an external power source to operate.

The nonlinearity created by the diodes 204 can be detected at the headend 101 as follows. Turning to FIG. 3A, an apparatus 300A for identifying a fraction of the ingress noise 188 tagged with the nonlinear tag 200A includes a nonlinear element 202' including a pair of diodes 204' connected to a load resistor 206'. The diodes 204' and the resistor 206' have characteristics corresponding to those of the diodes 204 and the resistor 206 of the nonlinear element 202 of the nonlinear tag 200A, to provide a similar magnitude a' of the nonlinear product. The apparatus 300A further includes a splitter 208' for splitting the upstream signal 110 into two portions, and a correlator 304 for correlating signals arriving at its two inputs 301 and 302. In operation, the signal 110 is correlated with a signal having an additional nonlinearity introduced by the nonlinear element 202'. If a fraction of the ingress noise 188 has been tagged with the nonlinear element 202 of the nonlinear tag 200A, the correlator 304 will show a peak 308 due to a matching nonlinearity added into the upstream signal 110 by the nonlinear tag 200A.

Referring to FIG. 2B, a burst-triggered attenuator tag 200B includes an RF-controllable attenuator 211 coupled to the splitter 208. In the embodiment shown, the RF-controllable attenuator 211 includes a bandpass filter 216 coupled to a detector 218, which is coupled to a variable attenuator 212. A fraction 214 of the return path signal 110 is directed by the splitter 208 to the bandpass filter 216. In operation, the RF bursts are filtered by the bandpass filter 216, detected by the detector 218, which causes the variable attenuator 212 to attenuate the return path signal 110 by a pre-defined magnitude M during the RF bursts in the return path signal 110. In this case, the parameter P of the response function R(x(t)), by which the tagged ingress noise 188 is identified at the headend 101, includes the magnitude of attenuation M of the return path signal 110 provided by the RF-controllable attenuator 212 during the RF bursts:

$$R(x(t)) \propto 1/M \quad (3)$$

wherein Eq. (3) applies during the RF bursts by a modem connected to the first node 102A. The bursts are represented by the magnitude x(t) exceeding a pre-defined threshold.

The ingress noise 188 tagged by the burst-triggered attenuator tag 200B can be detected at the headend 101 as follows. Turning to FIG. 3B, an RF burst 314 arrives at the detector 218 causing the detector 218 to provide a pulse 316 that causes the variable attenuator 212 to attenuate the return path signal 110 by the pre-defined magnitude M. With such a circuit, noise power would drop when modems were active on the leg where the noise was present. Since the headend 101 controls the transmission times of the individual modems, the information about locations of the presently active modems is available at the headend 101. Accordingly, the noise location can be identified by correlating the moments of the noise power drop with the moments at which particular modems are allowed to transmit the RF bursts 314.

Referring to FIG. 2C, a burst-triggered secondary path tag 200C includes an RF-controllable switch 230 and a first delay line 234 connected thereto, for providing a switchable secondary path 231 for the return path signal 110. The first delay line 234 has a fixed pre-determined delay value $\Delta t_1$. The RF-controllable switch 230 includes the bandpass filter 216 coupled to the detector 218, which is coupled to a relay 232. The fraction 214 of the return path signal 110 is directed by the splitter 208 to the bandpass filter 216. In operation, the RF bursts are filtered by the bandpass filter 216, detected by the detector 218, which causes the relay 232 to switch in the switchable secondary path 231 at time intervals between RF bursts by the cable modems. Since the secondary path 231 is switched in only when RF bursts are not present, the upstream communication is virtually unaffected by the presence of the burst-triggered secondary path tag 200C. The parameter P of the response function R(x(t)), by which the tagged ingress noise 188 is identified at the headend 101, includes the delay value $\Delta t_1$:

$$R(x(t)) \propto 1 + \beta \cdot x(t-\Delta t_1)/x(t) \quad (4)$$

wherein Eq. (4) applies between the RF bursts by a modem connected to the first node 102A, and wherein $\beta$ is a coefficient dependent on the split ratio of the splitters/combiners 208. The bursts are represented by the magnitude x(t) above a pre-defined threshold. To obtain the response y(t), R(x(t), t) in Eq. (1) is substituted for R(x(t)) of Eq. (4), so that $$y(t) \propto x(t) + \beta \cdot x(t-\Delta t_1) \quad (4a)$$

between the RF bursts by a modem connected to the first node 102A.

The ingress noise 188 tagged by the burst-triggered secondary path tag 200C can be detected at the headend 101 as follows. Turning to FIG. 3C, an apparatus 300C for identifying a fraction of the ingress noise 188 tagged with the burst-triggered secondary path tag 200C includes the splitter 208' for splitting the upstream signal 110 into two portions, and the correlator 304 for correlating signals arriving at its two inputs 301 and 302. In operation, the signal 110 is correlated with a delayed version of itself. When the delay $\Delta t$ equals to the delay time $\Delta t_1$ of the first delay line 234, secondary peaks 309 appears next to a main autocorrelation peak 310. The particular burst-triggered secondary path tag 200C can be identified by the position of the secondary peaks 209 relative to the main autocorrelation peak 310. The peaks 309 and 310 are separated by the delay value $\Delta t = \Delta t_1$.

Referring now to FIG. 2D, a lossy secondary path tag 200D includes a constant attenuator 242 coupled to a second delay line 244, for providing a constant secondary path 241 for a small fraction, generally 50% or less, of the return path signal 110. The left splitter 208 splits a fraction of the return path signal 110, and the second delay line 244 provides a fixed pre-determined delay $\Delta t_2$ for the split fraction. The delay $\Delta t_2$ is preferably at least 0.05 microseconds to provide reliable detection at the headend 101. In operation, the secondary path 241 mixes in the small fraction of the delayed return path signal 110 to the return path signal 110. The fraction is small enough not to impede reception of the return path signals 110 at the headend 101. Of course, the left splitter 208 and the attenuator 242 can be replaced by a single splitter, not shown, that splits but a small fraction of the return path signal 110. The parameter P of the response function R(x(t)), by which the tagged ingress noise 188 is identified at the headend 101, includes the delay value $\Delta t_2$:

$$R(x(t)) \propto 1 + \gamma \cdot x(t-\Delta t_2)/x(t) \quad (5)$$

wherein $\gamma$ is a coefficient dependent on the split ratio of the splitters/combiners 208 and the attenuation of the constant attenuator 242.

The ingress noise 188 tagged by the lossy secondary path tag 200D can be detected at the headend 101 in a similar fashion as the ingress noise 188 tagged by the burst-triggered secondary tag 200C discussed above. The apparatus 300C of FIG. 3C will detect the peak 309 delayed by the delay time $\Delta t_2$ of the second delay line 244.

Turning to FIGS. 2E and 2F, examples are presented of the subassembly 122 having a response function R(t) that does not depend on the magnitude x of the upstream signal. In FIG. 2E, a modulator tag 200E includes a modulator 252 for periodically attenuating the return path signal 110 at a pre-defined frequency f of several (for example, three) times per second to several (for example, three) times per hour. When the modulator tag 200E is coupled to a return path of the first node 102A of the plurality of nodes 102, 102A, the ingress noise 188 in the return path of the first node 102A can be identified at the headend 101 by detecting a frequency component of the ingress noise 188 at the modulation frequency f. In this case, the response function R(t) does not depend on the signal x. The parameter P of the response function R(t), by which the tagged ingress noise 188 is identified at the headend 101, includes the frequency f:

$$R(t) \propto (1+\delta \cdot \cos(2\pi f \cdot t)) \quad (6)$$

wherein δ is a coefficient proportional to the modulation depth. According to the invention, the housing 120 (FIG. 1B) of the modulator tag 200E has a form factor of a standard pluggable cable network component, making it easy to install or replace the modulator tag 200E. The modulator 200E can be powered by a signal harvester disclosed further below, or by a long-life internal battery such as a solid-state battery. To save the battery, the modulation step can be performed for a first time interval, followed by a second time interval when the modulation is not performed, wherein the ratio of the second time interval to the first time interval is at least 10:1. The first and the second intervals are then repeated, resulting in the modulator 200E operating for about 10% time or less, and preferably less than 1% and even 0.1% of time.

Referring now to FIG. 2F, a controllable attenuator tag 200F includes a controllable attenuator 262 for attenuating the return path signal 110 when a control signal 270 is provided to the tag device 200F by a test device, not shown, coupled to the tag device, or by the headend 101 in communication with the tag device 200F. When controllable attenuator tag 200F is coupled to a return path of the first node 102A of the plurality of nodes 102, 102A, the ingress noise 188 in the return path of the first node 102A can be identified at the headend 101 by providing the control signal 270 and detecting resulting attenuation of the ingress noise 188. The parameter P of the response function R(t), by which the tagged ingress noise 188 is identified at the headend 101, includes the magnitude of attenuation K of the return path signal 110 provided by the RF-controllable attenuator 212 during the RF bursts:

$$R(t) \propto 1/K \quad (7)$$

wherein Eq. (7) applies during application of the control signal 270. According to the invention, the housing 120 (FIG. 1B) of the controllable attenuator tag 200F has a form factor of a standard pluggable cable network component, making it easy to install or replace the controllable attenuator tag 200F. The controllable attenuator tag 200F can be combined with the modulator tag 200E. In one embodiment, the controllable attenuator tag 200F is powered by a signal harvester or by a long-life internal battery.

According to the invention, the tag device 111 can include combinations of the tags 200A to 200F described above. Referring to FIG. 4A, an example "compound" tag 400A includes the burst-triggered attenuator tag 200B of FIG. 2B combined with the lossy secondary path tag 200D of FIG. 2D. Referring to FIG. 4B, an example "compound" tag 400B includes the nonlinear tag 200A of FIG. 2A combined with the burst-triggered secondary path tag 200C of FIG. 2C. Combining different tags increases fidelity of determination of location of the ingress noise 188 by increasing the number of unique parameters P of a particular tag.

Referring to FIG. 5 with further reference to FIGS. 1A and 1B, a method 500 can be used for locating the ingress noise 188 in the cable network 100 using the tag devices 200A to 200D, 400A, and 400B. These tag devices have the response function R(x(t)) dependent on the magnitude of the upstream path signal 110 as exemplified by Eqs. (2) through (5) above. In a step 501, the return path signal 110 is tagged at the first node 102A of the plurality of nodes 102, 102A using the tag device 200A to 200D, 400A, or 400B, disposed at the first node 102A for providing a response characterized by a response function R(x(t)) having at least one unique predefined parameter P. In a step 502, the ingress noise 188 is detected at the headend 101. In a step 503, a portion of the ingress noise 188 detected in the step 502, that is generated at the first node 102A is identified by determining a property of the ingress noise 188 corresponding to the at least one parameter P of the response function R(x(t)) of the tag device 200A to 200D, 400A, or 400B. The identified parameter P is looked up in the database 112 to determine the first node 102A at which the ingress noise 188 has originated.

According to the invention, the housing 120 of the tags 111, 111A preferably has a form factor of a standard pluggable cable network component, making the tags 111, 111A easy to install into standard cable network equipment. Referring to FIGS. 6A to 6C, the standard form factors include a fuse (FIG. 6A), a filter (FIG. 6B), and an attenuator (FIG. 6C). The standard form factors considerably simplify deployment of tags of the invention, because with the standard form factor tags 111, one would be able to avoid a very large cost of modifying cable network equipment already installed in the field. Furthermore, such modification of the cable network equipment would result in prolonged interruptions of existing services, and such interruptions are very costly. When the body 120 of the tag device 111 has a standard form factor of the fuse (FIG. 6A), the filter (FIG. 6B), and the attenuator (FIG. 6C), standard connectors, sockets, etc. can be used with little or no interruption of the existing services.

Embodiments 200A to 200F of FIGS. 2A to 2F, respectively, are all most suitable for the attenuator form factor of FIG. 6C, because this is a standard form factor used across many vendors' amplifiers. Furthermore, the return path signals flow directly through attenuators. The embodiment 200B of 3B may also be suitable for the fuse form factor shown in FIG. 6A; the fuse could force a periodic, momentary attenuation of the return path signals.

The particular form factor depends on what lines of the cable network 100 need to be accessed. For example, the attenuator and the filter form factors of FIGS. 6C and 6B can be used for passive tags not requiring electrical power or control signals to operate. The fuse form factor of FIG. 6A can be used to tap electrical power for those of the tags 111 that may require an external electrical power source. By way of example, the modulator tag 200E can have a connection to a power line of the cable network 100, the connection being made by a tap having a form factor of the network fuse shown in FIG. 6A. It is preferable, however, that the tag devices 111, 111A do not depend on electrical power from power lines of the cable plant 100 for normal operation.

If some of the tags 111, 111A, in particular the modulator tag 200E of FIG. 2E, do require electrical power, the tags 111, 111A can be configured to operate only at a small percentage of time to conserve power. For example, the modulator tag 200E of FIG. 2E can operate for 1% of time or less, for example 0.1% or even 0.01%. In this case, an internal battery or a power harvester, collecting the power from the downstream and upstream electrical signals 108 and 110, can be used.

Turning to FIG. 7, a power harvester 700 includes the splitter 208 for splitting a small fraction of the downstream/upstream electrical signals 108 and 110, respectively, a limiting resistor 702, an isolating transformer 704, a rectifying diode bridge 706, and a storing capacitor 708. In operation, the limiting resistor 702 limits the power drawn from the downstream/upstream electrical signals 108 and 110 to a small value, for example not exceeding one microwatt. The diode bridge 706 rectifies the AC signal, which charges the storing capacitor 708, which provides power to the tag device 111. The tag device 111 tags the upstream signal 110 at a location where it is separated from the downstream signal 108 by a diplex filter 710. The power harvested is sufficient to charge the capacitor 708 sufficiently for the tag device 111 to power up, tag the ingress noise 188, and then shut down until the next tagging cycle. It may be also advantageous to install a solid state battery or ultra long life battery into the tag device 111. Of course, other types of power harvesters and/or batteries can be used.

Referring to FIG. 8, a method 800 is shown for locating the ingress noise 188 in the cable network 100 using the tag 200E of FIG. 2E. In a step 801, the tag device 200E is used to tag the return path signal 110 at the first node 102A of the plurality of nodes 102, 102A by periodically attenuating the return path signal 110 at the first frequency f of several times per second to several times per hour. In a step 802, the ingress noise 188 is detected at the headend 101. In a step 803, a fraction of the ingress noise 188 detected in step 802 that is modulated at the first frequency f is detected at the headend 101. The database 112 of the headend 101 includes the information that the first frequency f corresponds to the tag device 111A; this frequency f can then be used to identify the tag device 111A and, subsequently, the noisy node 102A. Importantly, the tagging of the step 801 is performed at the duty cycle of 1% or less to save power; at such a low duty cycle, an internal battery, for example a solid-state battery, or the harvester 700 of FIG. 7, can be used to power the modulator tag 200E.

According to an alternative embodiment of the invention, a technician has a capability to segment the ingress noise 188 by performing power interruption tests at the suspected node 102A. Turning to FIG. 9, an apparatus 900 for locating the ingress noise 188 in the cable network 100 includes a short-circuit relay 902 for periodic momentary short-circuiting or interruption of a power line 904 at the first node 102A of the plurality of nodes 102, 102A, and a RF analyzer 906 coupled to the cable plant 106. The power line 904 is for powering active devices 908 downstream of the first node 102A, including those connected to a second node 102B disposed downstream of the first node 102A.

The operation of the apparatus 900 will now be explained with reference to FIG. 10. In a step 1001, the short-circuit relay 902 periodically short-circuits the power line 904 at the first node 102A. In a step 1002, the RF analyzer 906 automatically detects absence of the supply power in the power line 904. In a step 1003, the RF analyzer 906 collects the upstream RF signal 110. If the ingress noise 188 originates at locations beyond active devices 908 disposed after the secondary node 102B, the ingress noise 188 will disappear at the moments when the power line 104 is pulled down. If, however, the ingress noise 188 originates at a location 910 between the first and second nodes 102A and 102B, the ingress noise 188 will remain. The interruptions are performed precisely, automatically, and periodically for momentary periods of time, for example for 10 milliseconds or less. Such a brief disruption is likely to superficially impact video services, and should have little or no impact to data and voice services. After the capture is complete, the short circuit is removed and normal network operation resumes. Also, in a preferred embodiment, the short-circuit relay 902 has a form factor of a cable network fuse of FIG. 6A.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A tag device for locating ingress noise in a cable network including a headend and a plurality of nodes in communication with the headend, the tag device comprising:
a housing; and
a subassembly within the housing, for providing a response to a return path signal, wherein the response is dependent on a magnitude of the return path signal and is characterized by a response function having at least one pre-defined parameter unique to the subassembly,
whereby, when the tag device is coupled to a return path of a first node of the plurality of nodes, ingress noise in the return path of the first node is identifiable at the headend,
wherein the subassembly comprises a RF-controllable switch and a first delay line connected thereto, for providing a switchable secondary path for the return path signal, wherein the RF-controllable switch is configured for switching in the switchable secondary path at time intervals between RF bursts in the return path signal, the switchable secondary path having a first delay, wherein the at least one parameter includes the first delay.

2. The tag device of claim 1, wherein the housing has a form factor of a cable network element selected from the group consisting of a return path equalizer, a fuse, and an attenuator.

3. The tag device of claim 1, wherein the subassembly is a passive subassembly not requiring an external power source to operate.

4. The tag device of claim 3, wherein the subassembly comprises a non-linear element for generating a non-linear product of the return path signal, wherein the at least one parameter includes a magnitude of the non-linear product.

5. The tag device of claim 1, wherein the subassembly comprises an RF-controllable attenuator for attenuating the return path signal by a pre-defined magnitude during RF bursts in the return path signal, wherein the at least one parameter includes the magnitude of attenuation.

6. A tag device for locating ingress noise in a cable network including a headend and a plurality of nodes in communication with the headend, the tag device comprising:
a housing; and
a subassembly within the housing, for providing a response to a return path signal, wherein the response is dependent on a magnitude of the return path signal and is characterized by a response function having at least one pre-defined parameter unique to the subassembly,
whereby, when the tag device is coupled to a return path of a first node of the plurality of nodes, ingress noise in the return path of the first node is identifiable at the headend,
wherein the subassembly comprises a first delay line for providing a first secondary path for no more than 50% of the return path signal, the first path having a first delay of at least 0.05 microseconds, wherein the at least one parameter includes the first delay.

7. The tag device of claim 6, wherein the subassembly comprises a RF-controllable switch and a second delay line connected thereto, for providing a switchable second secondary path for the return path signal, wherein the RF-controllable switch is configured for switching in the switchable second secondary path at time intervals between RF bursts in the return path signal, the switchable second secondary path having a second delay, wherein the at least one parameter includes the second delay.

8. The tag device of claim 6, further comprising a controllable attenuator for attenuating the return path signal when a control signal is provided to the tag device by a test device coupled to the tag device, or by the headend in communication with the tag device.

9. A tag device for locating ingress noise in a cable network including a headend and a plurality of nodes in communication with the headend, the tag device comprising:
a housing;
a modulator within the housing, for periodically attenuating the return path signal at a pre-defined frequency of several times per second to several times per hour, whereby, when the tag device is coupled to a return path of a first node of the plurality of nodes, ingress noise in the return path of the first node is identifiable at the headend; and
a controllable attenuator for attenuating the return path signal when a control signal is provided to the tag device by a test device coupled to the tag device, or by the headend in communication with the tag device,
wherein the housing has a form factor of a cable network element selected from the group consisting of a return path equalizer, a fuse, and an attenuator.

10. The tag device of claim 9, wherein the modulator is configured to operate for a first time interval, followed by a second time interval when the modulator does not operate, wherein the ratio of the second time interval to the first time interval is at least 10:1 or more.

11. The tag device of claim 10, further comprising a signal power harvester or a solid-state battery for powering the modulator.

12. The tag device of claim 9, wherein the modulator has a connection to a power line of the cable network, for powering by the power line, wherein the connection is by a tap having a form factor of a cable network fuse.

13. A method for locating ingress noise in a cable network including a headend and a plurality of nodes in communication with the headend, the method comprising:
(a) tagging a return path signal at a first node of the plurality of nodes using a tag device disposed at the first node, for providing a response to the return path signal, wherein the response is dependent on a magnitude of the return path signal and is characterized by a response function having at least one pre-defined parameter unique to the tag device;
(b) detecting the ingress noise at the headend; and
(c) identifying a portion of the ingress noise detected in step (b) that is generated at the first node, by determining a property of the ingress noise corresponding to the at least one parameter of the response function of the tag device;
wherein step (a) includes providing a secondary path for no more than 50% of the return path signal, the secondary path having a delay of at least 0.05 microseconds, wherein the at least one parameter includes the delay; and
wherein step (c) includes determining a position of a self-correlation peak in the ingress noise detected in step (b), wherein the position of the self-correlation peak corresponds to the delay.

14. The method of claim 13, wherein step (a) includes mixing in a non-linear product of the return path signal to the return path signal, wherein the at least one parameter includes a magnitude of the non-linear product; and
wherein step (c) includes determining a magnitude of the non-linear product in the ingress noise detected in step (b).

15. The method of claim 13, wherein step (a) includes attenuating the return path signal by a pre-defined magnitude during RF bursts in the return path signal at the first node, wherein the at least one parameter includes the magnitude of attenuation; and
wherein step (c) includes determining a magnitude of attenuation of the ingress noise detected in step (b) during the RF bursts.

16. A method for locating ingress noise in a cable network including a headend and a plurality of nodes in communication with the headend, the method comprising:
(a) tagging a return path signal at a first node of the plurality of nodes using a tag device disposed at the first node, for providing a response to the return path signal, wherein the response is dependent on a magnitude of the return path signal and is characterized by a response function having at least one pre-defined parameter unique to the tag device;
(b) detecting the ingress noise at the headend; and
(c) identifying a portion of the ingress noise detected in step (b) that is generated at the first node, by determining a property of the ingress noise corresponding to the at least one parameter of the response function of the tag device, wherein step (a) includes switching in a first secondary path for the return path signal at time intervals between RF bursts in the return path signal at the first node, wherein the at least one parameter includes a first delay of the first secondary path; and
wherein step (c) includes determining a position of a self-correlation peak in the ingress noise detected in step (b) between the RF bursts, wherein the position of the self-correlation peak corresponds to the first delay.

17. The method of claim 16, wherein step (a) includes providing a second secondary path for no more than 50% of the return path signal, the second secondary path having a second delay of at least 0.05 microseconds, wherein the at least one parameter includes the second delay; and
wherein step (c) includes determining a position of a self-correlation peak in the ingress noise detected in step (b), wherein the position of the self-correlation peak corresponds to the second delay.

* * * * *